US012618415B1

(12) United States Patent
Huang et al.

(10) Patent No.: US 12,618,415 B1
(45) Date of Patent: May 5, 2026

(54) FAN BEARING ANTI-SLIP FIXING STRUCTURE WITH BUSHING

(71) Applicant: ASIA VITAL COMPONENTS CO., LTD., New Taipei City (TW)

(72) Inventors: Jing-Ping Huang, New Taipei City (TW); Feng Liu, New Taipei City (TW); Zuo Zou, New Taipei City (TW); Sung-Wei Sun, New Taipei City (TW)

(73) Assignee: ASIA VITAL COMPONENTS CO., LTD., New Taipei City (TW)

( * ) Notice: Subject to any disclaimer, the term of this patent is extended or adjusted under 35 U.S.C. 154(b) by 0 days.

(21) Appl. No.: 19/171,544

(22) Filed: Apr. 7, 2025

(30) Foreign Application Priority Data

Feb. 14, 2025 (TW) .................................. 114105604

(51) Int. Cl.
 *F04D 29/05* (2006.01)
 *F04D 29/059* (2006.01)
 *F16C 27/04* (2006.01)
(52) U.S. Cl.
 CPC ............ *F04D 29/059* (2013.01); *F16C 27/04* (2013.01); *F16C 2360/46* (2013.01)
(58) Field of Classification Search
 CPC .............................. F04D 29/059; F04D 29/049
 See application file for complete search history.

(56) References Cited

U.S. PATENT DOCUMENTS

| | | | | |
|---|---|---|---|---|
| 4,719,352 A | * | 1/1988 | Miyatake | .................. G01J 1/36 |
| | | | | 250/350 |
| 5,982,066 A | * | 11/1999 | Marracino | ........... H02K 5/1735 |
| | | | | 310/90 |
| 8,864,460 B2 | * | 10/2014 | Childe | .................. F16C 25/083 |
| | | | | 415/170.1 |
| 2014/0154108 A1 | * | 6/2014 | Hirosawa | .............. F04D 25/062 |
| | | | | 417/353 |

FOREIGN PATENT DOCUMENTS

| | | |
|---|---|---|
| CN | 211924504 U | 11/2020 |
| TW | 202432926 A | 8/2024 |
| TW | M669346 U | 4/2025 |

OTHER PUBLICATIONS

Search Report dated Nov. 7, 2025, issued by Taiwan Intellectual Property Office for Taiwan Invention Application No. 114105604.

* cited by examiner

*Primary Examiner* — Michael L Sehn
(74) *Attorney, Agent, or Firm* — Demian K. Jackson; Jackson IPG PLLC

(57) ABSTRACT

A fan bearing anti-slip fixing structure with a bushing comprises a fan frame, a shaft, two bearings, two bushings and a first spring. The fan frame has a base with a bearing tube protruding therefrom. The shaft is disposed in the bearing tube. The two bearings are respectively installed in the bearing tube and disposed on the shaft, and respectively include an inner ring fitted to the shaft, and an outer ring fitted to the bearing tube. The two bushings and the first spring are disposed on the shaft and located between the (Continued)

inner rings of the two bearings. The two bushings respectively abut the inner rings of the two bearings, and the first spring is located between the two bushings, and an axial elastic supporting force is generated between the two inner rings via the two bushings.

5 Claims, 5 Drawing Sheets

FAN BEARING ANTI-SLIP FIXING STRUCTURE WITH BUSHING

This application claims the priority benefit of Taiwan patent application number 114105604 filed on Feb. 14, 2025, the disclosure of which is hereby incorporated by reference in its entirety.

FIELD OF THE INVENTION

The present invention relates to a bearing fixing structure, and more particularly to a fan bearing anti-slip fixing structure with a bushing.

BACKGROUND OF THE INVENTION

As shown in FIG. 1, the fan bearing structure includes a fan impeller 11, a base bracket 12, two bearings 13, 14, and upper and lower springs 151, 152. The fan impeller 11 is provided with a rotating shaft 111, and the base bracket 12 is provided with a bearing tube 121. The two bearings 13 and 14 are respectively installed in the bearing tube 121. The rotating shaft 111 is fitted with the two bearings 13 and 14. A spacer 122 is provided in the bearing tube 121, and the two bearings 13 and 14 are distributed above and below the spacer 122. The upper and lower springs 151 and 152 are respectively arranged between the spacer 122 and the two bearings 13 and 14 to apply pressure to the outer rings of the bearings 13 and 14, ensuring that the outer ring raceways are stable and stress is distributed evenly during operation. This double-spring design enables the balls in the bearings 13 and 14 to run smoothly, reducing friction noise during low-speed operation of the fan. Meanwhile, during installation and transportation, the springs 151 and 152 provide effective buffering protection for the bearings 13 and 14, reducing damage caused by external impact.

However, this structure primarily focuses on the stability of the outer rings of the bearings 13 and 14 and fails to fully address the problem of radial slipping between the inner rings of the bearings and the rotating shaft 111 during high-speed operation. Consequently, under high-speed conditions, there remains a risk of early bearing failure due to radial slipping.

Furthermore, the bearing assembly in current fans may adopt the following two methods:

1. Clearance fit assembly: This method employs a clearance fit between the inner ring of the bearing and the rotating shaft, as well as between the outer ring of the bearing and the bearing tube. This assembly process is simple, offering high efficiency and low cost. However, the clearance fit between the inner ring and the rotating shaft, and between the outer ring and the bearing tube, allows for movement. As fan speed increases, the centrifugal force generated by the high-speed operation of the impeller causes insufficient friction to prevent radial slipping. Over prolonged operation, the bearings are prone to wear and failure, thus shortening the fan's service life.

2. Interference fit and glue fixation: In this method, an interference fit is applied between the inner ring of the bearing and the rotating shaft, while the outer ring and the bearing tube are secured with glue. However, this assembly process is complex, requiring precise size control and accurate glue application, resulting in low assembly efficiency and significantly higher manufacturing costs. Additionally, when the fan is subjected to external impact, micro cracks are likely to form at the glue joints, causing the preload within the bearing to be lost. Consequently, the balls cannot maintain their position on the predetermined raceways of the inner and outer rings, leading to micro-motion wear and eventual early bearing failure.

Therefore, the above two assembly methods exhibit clear deficiencies with regard to high-speed operation stability and cost control: (1) Bearings assembled with clearance fit cannot effectively resist radial slipping during high-speed operation. (2) Bearings assembled with interference fit and glue fixation incur high assembly costs and remain susceptible to failure under external forces. As a result, existing technologies struggle to simultaneously satisfy the requirements of fan stability during high-speed operation, simple assembly, and cost efficiency.

Thus, addressing the aforementioned conventional problems and deficiencies is a key focus for the inventor of the present application and related manufacturers in this industry.

SUMMARY OF THE INVENTION

An object of the present invention is to provide a fan bearing anti-slip fixing structure with a bushing that addresses the aforementioned issues.

The fan bearing anti-slip fixing structure with a bushing of the present invention includes a fan frame, a shaft, a first bearing, a second bearing, a first bushing, a second bushing, and a first spring. The fan frame has a base, with a protruding bearing tube disposed on the base. The shaft has a connecting end attached to a fan impeller and a free end extending into the bearing tube. The first bearing and the second bearing are located within the bearing tube and are disposed on the shaft to support the rotation of the fan impeller. Each of the first bearing and the second bearing includes an inner ring fitted to the shaft and an outer ring fitted to the bearing tube.

The first bushing and the second bushing are respectively sleeved on the shaft and positioned between the inner rings of the first bearing and the second bearing. The first bushing abuts the inner ring of the first bearing from below, while the second bushing abuts the inner ring of the second bearing from above. The first spring is sleeved on the shaft and located between the first bushing and the second bushing, with its two ends respectively abutting the first bushing and the second bushing. This arrangement generates an axial elastic supporting force between the inner rings of the first bearing and the second bearing via the first bushing and the second bushing, securely fixing the inner rings at a predetermined position. Consequently, radial slipping between the inner rings of the first and second bearings and the shaft during high-speed fan operation is effectively restricted, thereby improving the stability of the first and second bearings and extending their service life.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The above-mentioned objectives and structural and functional features of the present invention will be described based on the preferred embodiments of the accompanying drawings.

Figure 1:
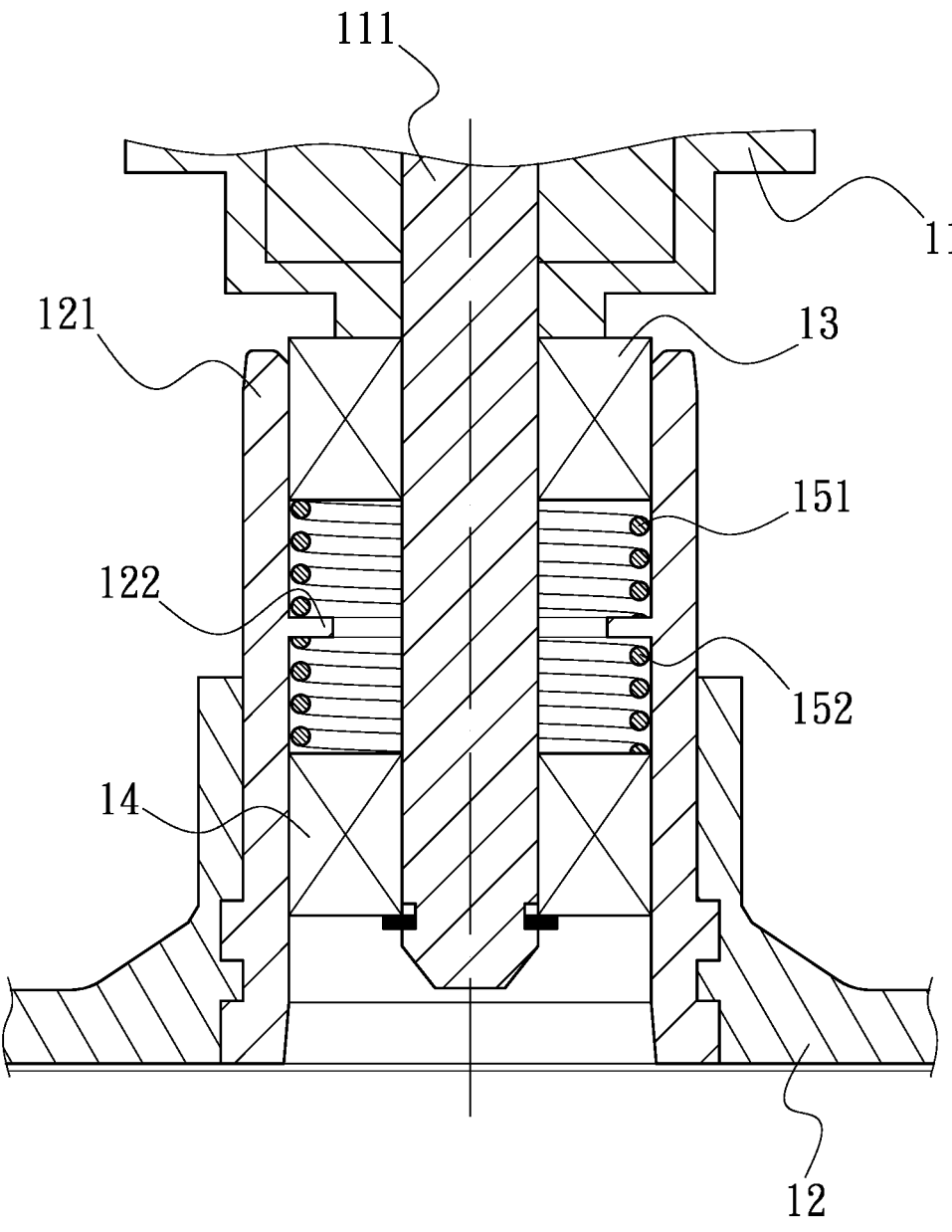
FIG. 1 is a schematic diagram of the prior art.
Figure 2:
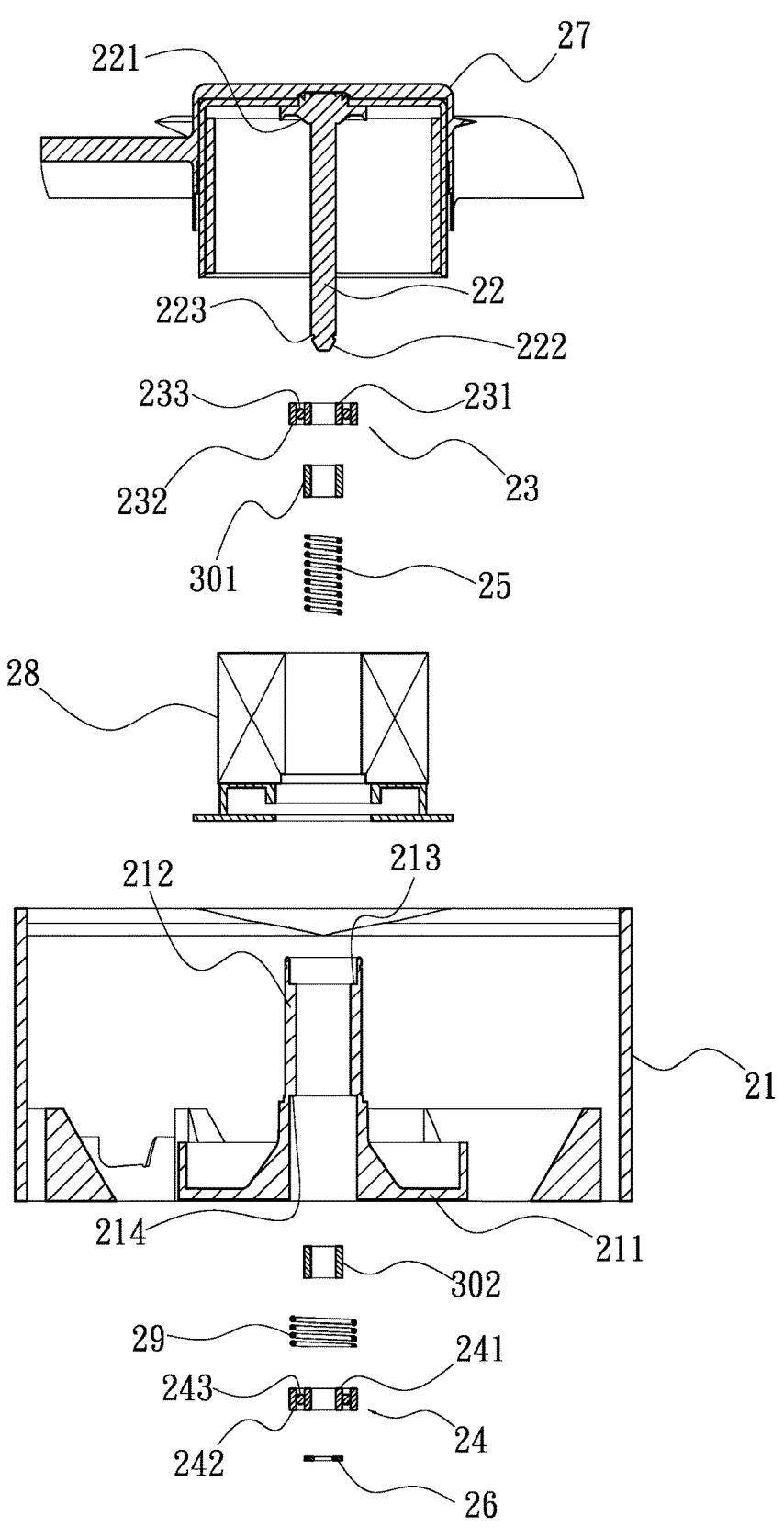
FIG. 2 is a schematic cross-sectional exploded view of the present invention.
Figure 3:
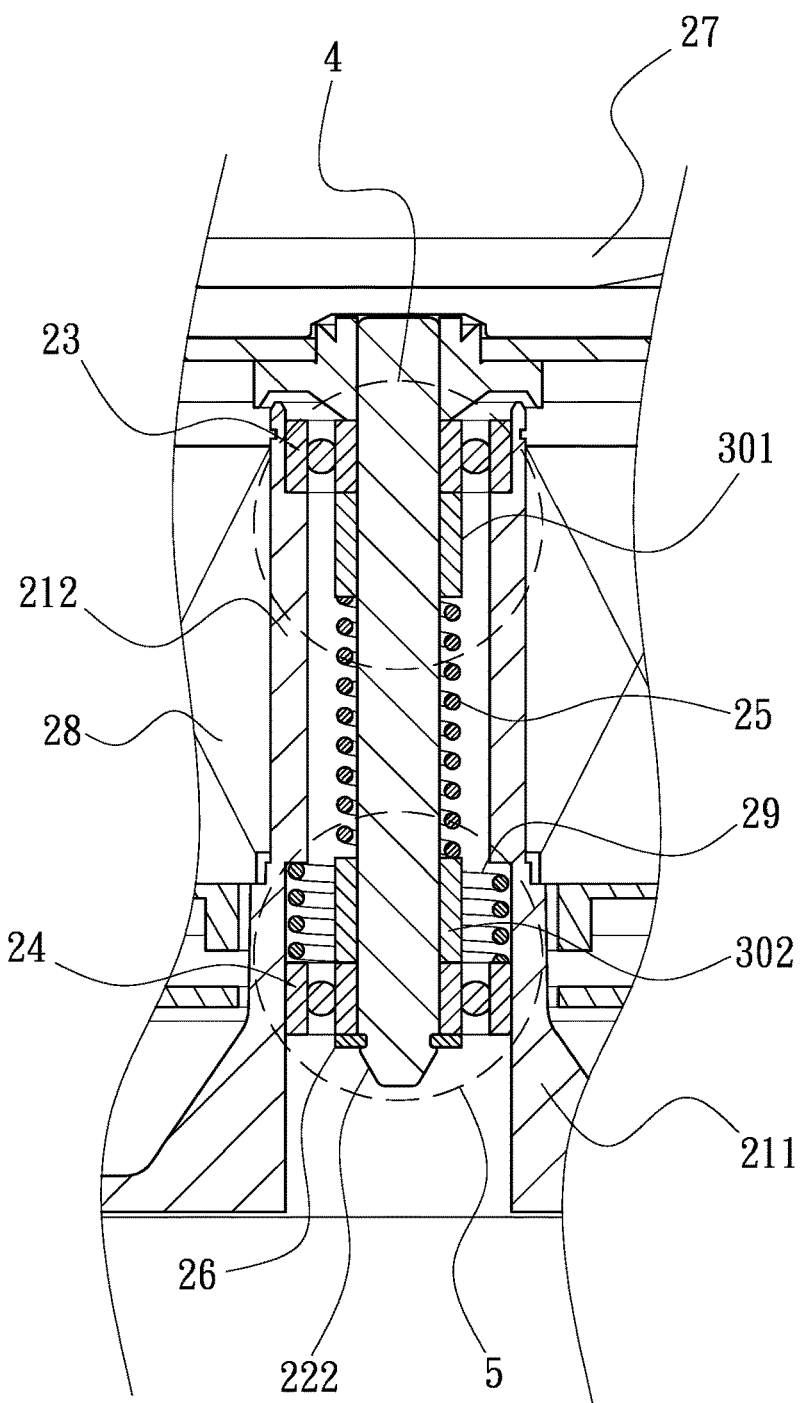
FIG. 3 is a partial cross-sectional schematic diagram of the present invention.
Figure 4:
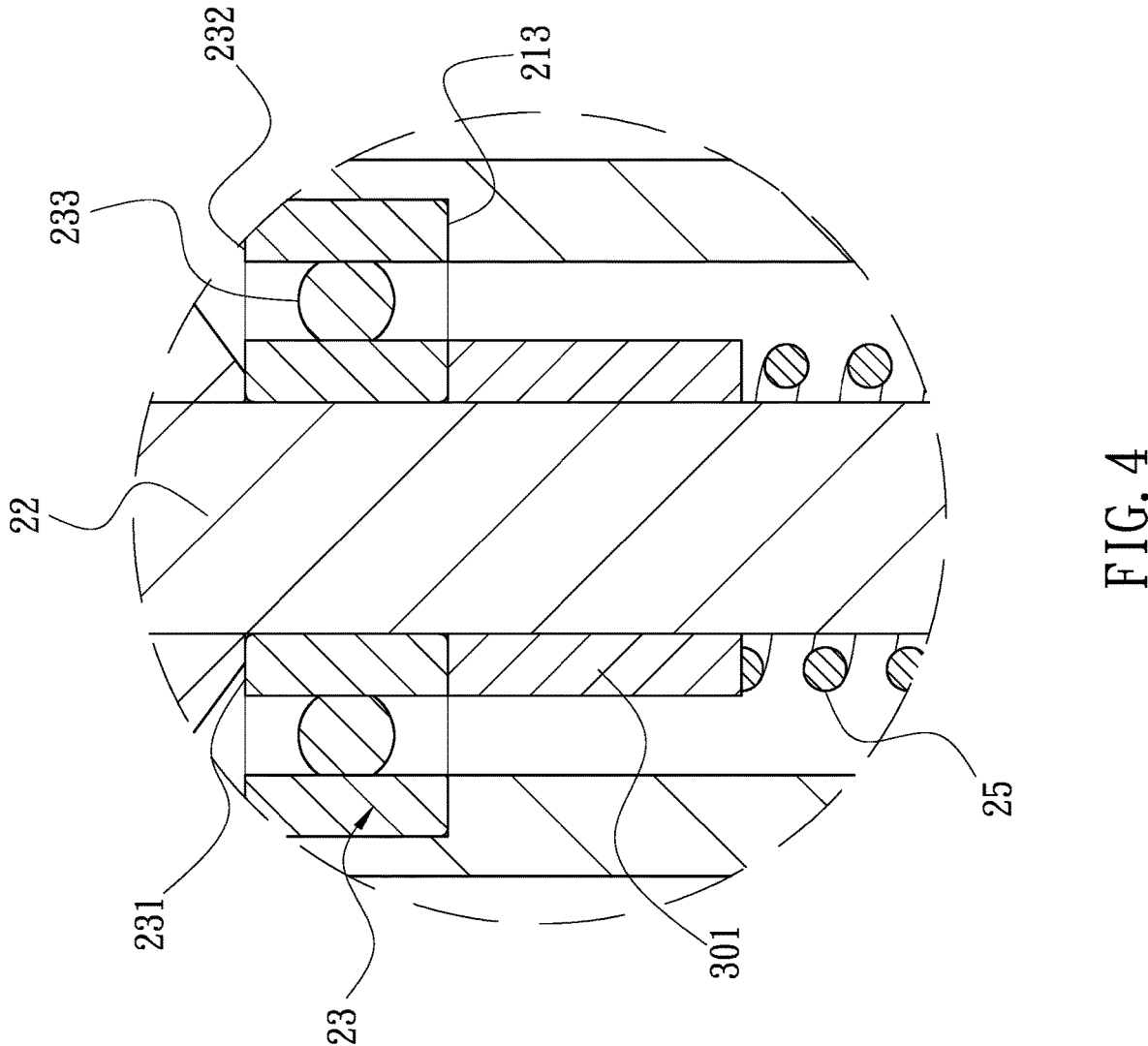
FIG. 4 is a partial enlarged view of FIG. 3.
Figure 5:
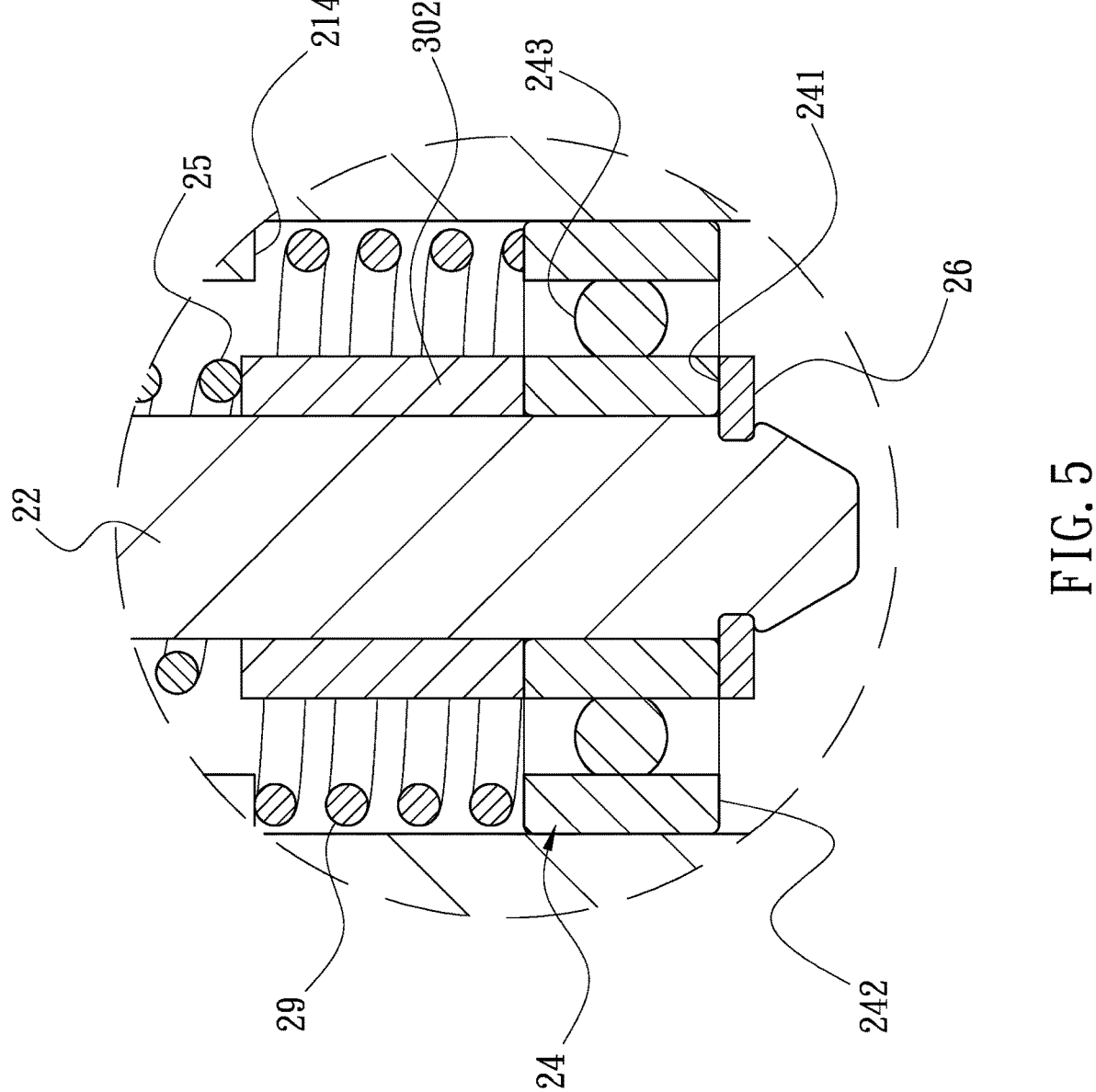
FIG. 5 is a partial enlarged view of FIG. 3.

Please refer to FIGS. 2-5. FIG. 2 is a schematic cross-sectional exploded view of the present invention. FIG. 3 is a schematic partial cross-sectional assembly view of the present invention. FIG. 4 is a partial enlarged view of FIG. 3. FIG. is a partial enlarged view of FIG. 3.

As shown in the diagrams, the present invention includes the following elements: a fan frame 21, a shaft 22, a first bearing 23, a second bearing 24, a first bushing 301, a second bushing 302, and a first spring 25 and a second spring 29.

The fan frame 21 has an air inlet side and an air outlet side. A base 211 is provided at the center of the air outlet side. The base 211 protrudes upward to form a hollow bearing tube 212. A stator 28 is disposed around the exterior of the bearing tube 212. Inside the bearing tube 212, an upper abutment portion 213 and a lower abutment portion 214 are respectively disposed at the upper and lower ends, arranged in a stepped configuration on the inner wall to support the positioning of the bearings.

The shaft 22 includes a connecting end 221 and a free end 222. The connecting end 221 is used to secure the fan impeller 27. The free end 222 extends into the interior of the bearing tube 212. A neck portion 223 is disposed adjacent to the free end 222 for the installation of additional components.

The first bearing 23 and the second bearing 24 are installed within the bearing tube 212 and are respectively disposed on the upper abutment portion 213 and the lower abutment portion 214. The first bearing 23 and the second bearing 24 each include an inner ring 231, 241 sleeved on the shaft 22. The outer rings 232, 242 are fitted to the inner wall of the bearing tube 212. A plurality of rolling members 233, 243 disposed between the inner rings 231, 241 and the outer rings 232, 242 to enable relative rotation between the inner and outer rings The first bushing 301 and the second bushing 302 are sleeved on the shaft 22 and positioned between the inner rings 231 and 241 of the first bearing 23 and the second bearing 24. Specifically, the first bushing 301 is located below the first bearing 23 and abuts against the inner ring 231 thereof, and the second bushing 302 is located above the second bearing 24 and abuts against the inner ring 241 thereof.

The first spring 25 is sleeved on the shaft 22 and is located between the first bushing 301 and the second bushing 302. The two ends respectively abut against the first bushing 301 and the second bushing 302, generating an axial elastic supporting force between the first bushing 301 and the second bushing 302. This axial force is transmitted through the first bushing 301 and the second bushing 302 to the inner ring 231 of the first bearing 23 and the inner ring 241 of the second bearing 24.

In this configuration, the first bushing 301 and the second bushing 302 cooperate with the first spring 25, ensuring that the first spring 25 directly contacts the bushings rather than applying force directly to small areas of the inner rings 231 and 241 of the first bearing 23 and the second bearing 24.

This design distributes stress, thereby extending the service life of the inner rings 231 and 241. Additionally, the first bushing 301 and the second bushing 302 provide stable support, preventing the first spring 25 from shifting due to movement or vibration. Furthermore, the bushings serve as positioning elements, stabilizing the positions of the inner rings 231 and 241 and the first spring 25 during assembly.

In addition, a second spring 29 is disposed between the outer ring 242 of the second bearing 24 and the lower abutment portion 214. One end of the second spring 29 abuts against the lower abutting portion 214, and the other end contacts the outer ring 242 of the second bearing 24, providing additional positioning support. The free end 222 of the shaft 22 passes through the inner ring 241 of the second bearing 24 and extends downward. The neck portion 223 of the free end 222 is engaged with a retaining ring 26, which presses against the inner ring 241 from the lower side of the second bearing 24, thereby preventing the second bearing 24 and the second spring 29 from detaching from the shaft 22 and the bearing tube 212.

Through the above arrangement, the preload generated by the first spring 25 is applied to the inner ring 231 of the first bearing 23 and the inner ring 241 of the second bearing 24 via the first bushing 301 and the second bushing 302, creating an axial elastic supporting force between the inner rings 231 and 241. This securely fixes the inner rings 231 and 241 in their predetermined positions. During high-speed operation of the fan impeller 27, the first bushing 301 and the second bushing 302 act as fixed points to restrict radial slipping between the inner rings 231, 241 and the shaft 22, thereby enhancing the stability of the first bearing 23 and the second bearing 24 and effectively extending their service life.

The present invention has been described with a preferred embodiment thereof, and it is understood that many changes and modifications to the described embodiment can be carried out without departing from the scope and the spirit of the invention, which is intended to be limited only by the appended claims.

What is claimed is:

1. A fan bearing anti-slip fixing structure with a bushing, comprising:

a fan frame having a base with a bearing tube disposed on the base;

a shaft having a connecting end connected to a fan impeller and a free end extending into the bearing tube;

a first bearing and a second bearing located in the bearing tube and disposed on the shaft, each of the first bearing and the second bearing including an inner ring and an outer ring and a plurality of rolling members disposed between the inner ring and the outer ring, the outer ring fitted to the bearing tube, and the inner ring fitted to the shaft;

a first bushing and a second bushing respectively sleeved on the shaft and located between the inner rings of the first bearing and the second bearing, the first bushing abutting against the inner ring of the first bearing from below, and the second bushing abutting against the inner ring of the second bearing from above;

a first spring sleeved on the shaft and located between the first bushing and the second bushing, two ends of the first spring respectively abutting against the first bushing and the second bushing to generate an axial elastic supporting force between the inner rings of the first bearing and the second bearing through the first bushing and the second bushing, thereby the inner rings firmly fixed at a predetermined position through the first bushing and the second bushing to restrict radial relative sliding between the inner rings and the shaft during high-speed operation of the fan.

2. The fan bearing anti-slip fixing structure with a bushing of claim 1, wherein the bearing tube has an upper abutment portion and a lower abutment portion, and the first bearing and the second bearing are respectively disposed on the upper abutment portion and the lower abutment portion.

3. The fan bearing fixing anti-slip structure with a bushing of claim 2, wherein a second spring is disposed between the outer ring of the second bearing and the lower abutment portion, and one end of the second spring abuts the lower abutment portion and the other end abuts the outer ring of the second bearing.

4. The fan bearing anti-slip fixing structure with a bushing of claim 3, wherein the shaft has a neck portion adjacent to the free end, and the neck portion is retained by a retaining ring, and the retaining ring abuts against the inner ring of the second bearing from the other side of the second bearing.

5. The fan bearing anti-slip fixing structure with a bushing of claim 2, wherein the outer ring of the first bearing abuts against the upper abutment portion.

*    *    *    *    *